(12) United States Patent
Thomas (10) Patent No.: US 8,580,175 B2
(45) Date of Patent: Nov. 12, 2013

(54) CONTINUOUS CURING AND POST-CURING METHOD

(71) Applicant: Michael R. Thomas, St. Clair, MO (US)

(72) Inventor: Michael R. Thomas, St. Clair, MO (US)

( * ) Notice: Subject to any disclaimer, the term of this patent is extended or adjusted under 35 U.S.C. 154(b) by 0 days.

(21) Appl. No.: 13/647,340

(22) Filed: Oct. 8, 2012

(65) Prior Publication Data

US 2013/0026673 A1    Jan. 31, 2013

Related U.S. Application Data

(63) Continuation of application No. 13/448,341, filed on Apr. 16, 2012, now Pat. No. 8,282,384.

(60) Provisional application No. 61/476,220, filed on Apr. 15, 2011.

(51) Int. Cl.
*B29C 47/78* (2006.01)
*B29C 47/88* (2006.01)

(52) U.S. Cl.
USPC ............ 264/211.12; 264/211.15; 264/211.18; 264/177.17; 264/477; 264/495; 425/325; 425/335; 425/378.1; 425/404; 425/445; 242/157 R; 242/364.11; 242/412

(58) Field of Classification Search
USPC ............. 264/211.12, 211.14, 211.15, 211.17, 264/211.18, 211.2, 464, 477, 495, 639, 264/171.13, 172.11, 176.1, 177.17, 177.19, 264/209.6; 425/66, 72.1, 72.2, 325, 335, 425/337, 377, 378.1, 384, 404, 445, 501, 425/506, 508, 509; 242/157 R, 474.4, 242/364.11, 364.2, 412, 420
See application file for complete search history.

(56) References Cited

U.S. PATENT DOCUMENTS

| | | | |
|---|---|---|---|
| 1,687,339 A | 10/1928 | Lewellen | |
| 2,377,392 A | 6/1945 | Wiley | |
| 2,715,753 A | 8/1955 | McLellan | |
| 2,974,363 A | 3/1961 | Hans | |
| 3,056,711 A * | 10/1962 | Frickert | 65/500 |
| 3,161,706 A | 12/1964 | Peters | |
| 3,231,167 A * | 1/1966 | Heuvelmans | 226/189 |
| 3,279,711 A | 10/1966 | Erich et al. | |
| 3,279,904 A | 10/1966 | Russell et al. | |
| 3,544,017 A | 12/1970 | Neuhaus et al. | |
| 3,668,853 A * | 6/1972 | Lang | 57/339 |
| 3,673,650 A | 7/1972 | Cerutti | |
| 3,762,147 A | 10/1973 | Wuest | |
| 3,801,242 A | 4/1974 | Bauch | |
| 3,819,344 A | 6/1974 | Thumm et al. | |
| 3,856,445 A | 12/1974 | Norwood | |

(Continued)

*Primary Examiner* — Seyed Masoud Malekzadeh
(74) *Attorney, Agent, or Firm* — Doster Greene, LLC (57) ABSTRACT

A method of continuous curing and post-curing of a plurality of extruded strands is provided. A plurality of extruded strands is wrapped through a plurality of spindle units rotatably connected to a rigid frame structure. A plurality of dual spindles are provided in a plurality of upper and lower spindle units, wherein each dual spindle comprises a free spinning roller and a driven roller. A chamber that comprises a dual function chamber configured for heating and cooling is supported on the rigid frame structure. The plurality of extruded strands is continuously transferred between the upper spindle units and the lower spindle units such that the plurality of extruded strands runs in a vertical fashion that continuously alternates between the lower spindle units and the upper spindle units. Each of the plurality of strands is transferred independently of each other and continuously passed through the chamber for continuous curing and post-curing.

9 Claims, 7 Drawing Sheets

(56) References Cited

U.S. PATENT DOCUMENTS

| | | | |
|---|---|---|---|
| 4,018,641 A | 4/1977 | Donaldson | |
| 4,115,511 A | 9/1978 | Mauritzon | |
| RE29,959 E | 4/1979 | Schippers et al. | |
| 4,155,695 A | 5/1979 | Karppo et al. | |
| 4,332,752 A * | 6/1982 | Henne et al. | 264/41 |
| 4,371,491 A * | 2/1983 | Benai et al. | 264/196 |
| 4,392,801 A * | 7/1983 | Meyer | 425/71 |
| 4,477,033 A | 10/1984 | Kotzur et al. | |
| 4,529,368 A * | 7/1985 | Makansi | 425/72.2 |
| 4,824,517 A * | 4/1989 | Leahy | 156/767 |
| 4,909,976 A * | 3/1990 | Cuculo et al. | 264/211.15 |
| 5,037,284 A | 8/1991 | Angell et al. | |
| 5,173,310 A * | 12/1992 | Katou et al. | 425/72.2 |
| 5,343,601 A * | 9/1994 | Schippers | 28/258 |
| 5,508,775 A | 4/1996 | Mizuno | |
| 5,621,637 A * | 4/1997 | Spahlinger | 700/9 |
| 5,661,880 A * | 9/1997 | Schippers et al. | 28/240 |
| 5,928,579 A | 7/1999 | Spahlinger et al. | |
| 5,928,587 A | 7/1999 | Schippers | |
| 6,887,410 B2 | 5/2005 | Kress et al. | |
| 6,890,166 B2 * | 5/2005 | Kirchhoff | 425/66 |
| 6,994,534 B2 | 2/2006 | Lee et al. | |
| 7,438,548 B2 | 10/2008 | Augustine et al. | |
| 7,625,194 B2 | 12/2009 | Yoshida et al. | |
| 7,682,142 B2 | 3/2010 | Lennemann et al. | |
| 7,802,977 B2 | 9/2010 | Schroter et al. | |
| 7,845,923 B2 | 12/2010 | Lennemann et al. | |
| 8,137,094 B2 | 3/2012 | Boissonnat et al. | |
| 2009/0022833 A1 | 1/2009 | Schroter et al. | |
| 2009/0184446 A1 | 7/2009 | Kawata et al. | |

* cited by examiner

CONTINUOUS CURING AND POST-CURING METHOD

REFERENCE TO RELATED APPLICATION

This application is a continuation of U.S. application Ser. No. 13/448,341, filed Apr. 16, 2012, now issued as U.S. Pat. No. 8,282,384, which claims priority of U.S. Provisional Patent Application Ser. No. 61/476,220, which was filed on Apr. 15, 2011, which is now expired. The subject matter of the earlier filed application is hereby incorporated by reference.

BACKGROUND OF THE EMBODIMENT

1. Technical Field of the Embodiment

The present embodiment relates in general to a method and apparatus for the continuous curing and post curing of strands of extruded rubber products and the like. More specifically, the present embodiment relates to a method and apparatus that can continuously perform both curing and/or post curing processes of strands of extruded rubber and similar products.

2. Description of the Related Art

Several types of apparatuses and methods are employed for the continuous curing of longitudinally extruded strands of rubber and similar products. Conventional apparatuses offer discontinuous or batch processes for curing rubber and related extruded strands. The conventional apparatus and methods typically cure continuous lengths of extruded strands in a continuous fashion in a liquid salt bath or curing oven with heat and/or through a microwave process, and are then post-cured in a batch fashion. Where the extrudate is cut and post-cured in an oven or autoclave. The conventional method of batch post-curing is inefficient due to the presence of multiple manufacturing processes, increased labor, and resulting overhead expenses.

Various apparatuses and methods exist for the curing of different types of materials. U.S. Pat. No. 4,155,695 issued to Karppo on May 22, 1979 discloses an apparatus for continuous curing of elongated products, such as cables comprising a conductor surrounded by a mantle of cross linkable material. The cable is passed longitudinally through a curing tube for heating the cable to a curing temperature and subsequently subjected to cooling. The heating of the cable in the heating zone is carried out by means of heat radiation in a pressurized gas atmosphere and the cooling of the cable is carried out in the presence of a gas under pressure so that heat is transferred from the heated cable in the cooling zone partially by radiation to the cooled wall of the tube and partly by convection to said cooled gas.

U.S. Pat. No. 4,356,143 issued to Hill on Oct. 26, 1982 discloses an apparatus and a method for the curing of a continuous length of curable material. The length of material is passed through a curing chamber defined by a tubular body. This tubular body is disposed in the upper part of another heated tubular body which contains a heat exchange liquid. This liquid is fed to one or more injectors disposed at one or both ends of the body, injected along the chamber, and then allowed to drain back into to the body. The body contains a further tubular body downstream of, and partitioned from, the original tubular body. The tubular body also has an injector through which water is injected to cool the length of material. The tubular body may be provided with drain holes through which heat exchange liquid can be quickly drained at the end of a curing run. It may also be provided with air vents or a longitudinal slot in its upper part to release trapped air. Devices for wiping heat exchange liquid clinging to the cured material on emergence from the curing chamber are also provided.

U.S. Pat. No. 7,198,476 issued to Harcourt on Apr. 3, 2007 discloses an apparatus and process for continuously vulcanizing a hose. Pressurized air or other gas is intermittently supplied through a woven jacket, a mandrel a check valve and into the interior of an extruded rubber hose. The hose is sealed as it is pulled over the mandrel. Pinch rollers seal the other end of the hose. One or more non-contact heaters vulcanize the hose from outside-in. Pressurizing the inside of the hose maintains proper diametrical dimensions of the hose.

The above conventional apparatuses and methods employ batch processing of the extrudate in the cooling zone, and uses pressurized hot air or other gas in the heating zone. Generally these conventional apparatuses and methods cure in a continuous fashion in a liquid salt bath or curing oven with heat and/or microwaves; and are then post-cured in a batch fashion where the extrudate is cut and post-cured in an oven or autoclave. These methods cannot be employed for the simultaneous and continuous curing of multiple strands of the extrudate.

Hence, it can be seen that there is a need for an improved method and apparatus for the continuous curing of extrudates. Continuous curing is preferred to the discontinuous curing processes because the quality of the final product is higher due to the ability to accommodate longer extrudates and easier quality control. The continuous curing method is also more economical due to the presence of high speed lines and the absence of the need for the intermediate conveying of the extrudate. Lower overall costs as a result of less manpower, less space requirements, and lower energy requirements are additional benefits realized as a result of using the continuous curing method and apparatus.

SUMMARY OF THE INVENTION

The present invention may satisfy one or more of the above-mentioned desirable features. Other features and/or advantages may become apparent from the description which follows.

The present invention provides an apparatus for continuous curing of a plurality of extruded strands. The apparatus comprises a rigid frame structure formed by interconnecting a plurality of rigid frame members having a top portion, a bottom portion, side portions, a front portion and a rear portion. A rigid top plate member is attached to an upper part of the front portion and a rigid bottom plate member is attached to a lower part of the front portion. A plurality of upper spindle units is rotatably attached to the rigid top plate member and a plurality of lower spindle units is rotatably attached to the rigid bottom plate member. A pair of drive motors is attached to the rigid frame structure. A gear assembly attached to the rigid frame structure is operably engaged to the pair of drive motors and a chamber is supported on the rigid frame structure for curing the plurality of extruded strands. The pair of drive motors drives the gear assembly to continuously pass the plurality of extruded strands through the chamber for continuous curing and post-curing.

Multiple lines of the plurality of extruded strands are passed through the flee spinning roller and the driven roller of each of the plurality of spindle units. The plurality of extruded strands is wrapped around the free spinning roller and the driven roller. The pair of drive motors is employed for rotating the plurality of spindle units. The plurality of extruded strands is allowed to pass through a dual function chamber for heating/cooling at a speed determined by the speed of the pair of drive motors. The plurality of extruded strands is allowed to remain in a heat/cool zone exerted by the dual function chamber for a predetermined period of time. This makes a continuous process of curing of the plurality of extruded strands.

The apparatus and method cures and post-cures extrudate by the method of high velocity heat or forced-air convection concentrated around the extrudate and also can cool the extrudate in the same fashion as heating it via heat-exchange coils in the passage way of the forced air convection where the forced air is passed through the fined coils of the heat exchanger and closed looped refrigeration is passed through the fined coils to chill the forced air to a desired temperature. This apparatus and method also de-humidifies the extrudate by sensing the humidity within a forced air convection chamber and when there is too much humidity the apparatus calls for low dew-point air that is injected into the forced air convection chamber and vents out the most humid air based on the location of the vent(s) in the system and lowers the humidity to a desired level which in turn lowers the humidity of the product.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. The skilled artisan will understand that the drawings described below are for illustrative purposes only. The drawings are not intended to limit the scope of the present teachings in any way.

DETAILED DESCRIPTION OF THE VARIOUS EMBODIMENTS

In the following discussion that addresses a number of embodiments and applications of the present teachings, reference is made to the accompanying drawings that form a part hereof, and in which is shown by way of illustration specific embodiments in which the invention may be practiced. It is to be understood that other embodiments may be utilized and changes may be made without departing from the scope of the present teachings.

Various inventive features are described below that can each be used independently of one another or in combination with other features. For purposes of better understanding of the present teachings and in no way limiting the scope of the teachings, it will be clear to one of skill in the art that the use of the singular includes the plural unless specifically stated otherwise. Therefore, the terms "a", "an", and "at least one" are used interchangeably in this application.

Figure 1:
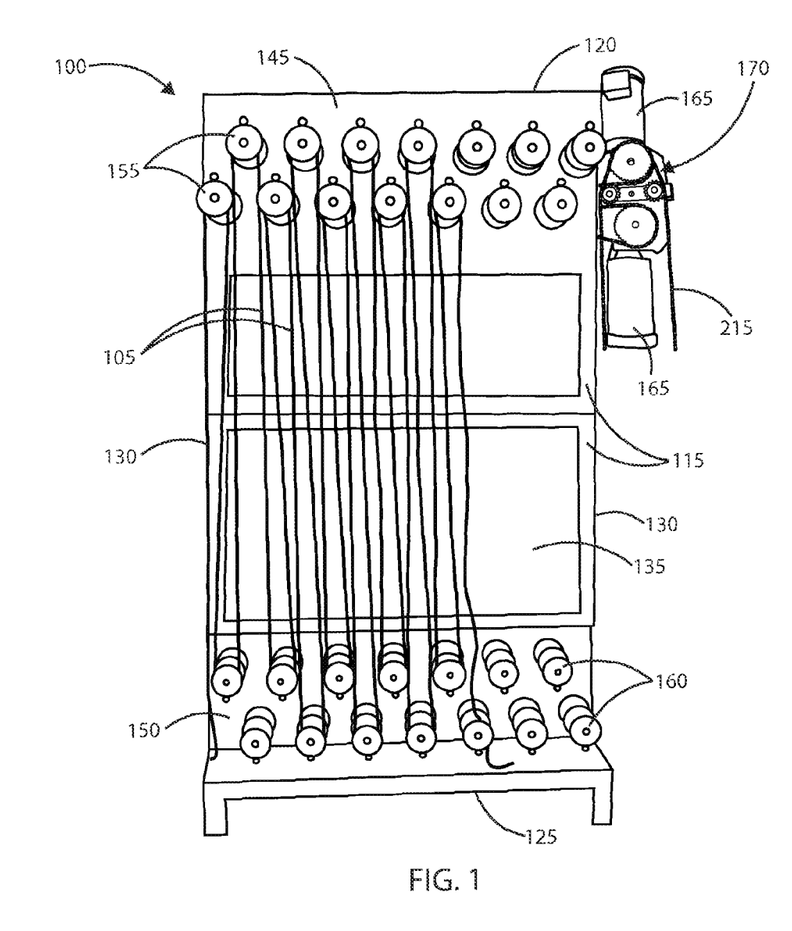
FIG. 1 is a front view of an apparatus in use for continuous curing of a plurality of extruded strands in accordance with the present teachings.
Figure 6:
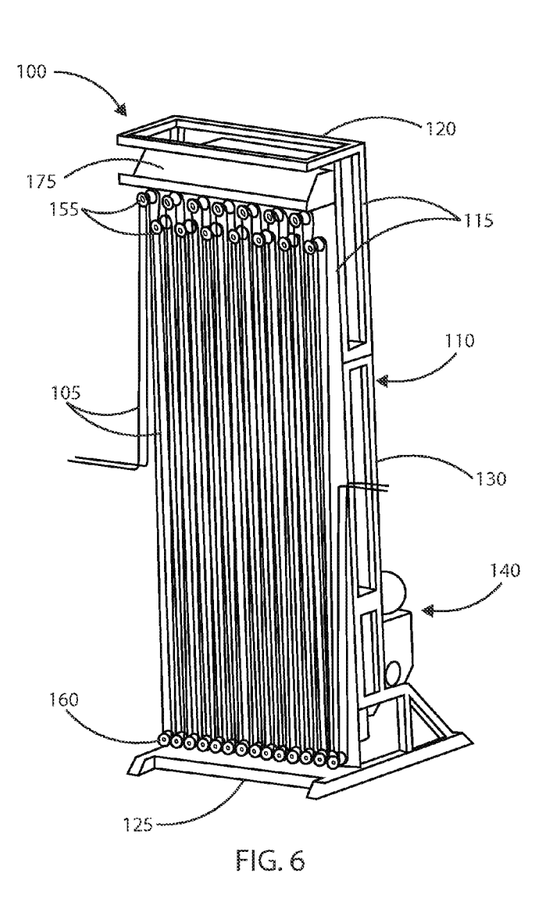
FIG. 6 illustrates a perspective view of the apparatus for continuous curing of the plurality of extruded strands in accordance with the present teachings.

A front view of an exemplary embodiment of an apparatus 100 that can be used for continuous curing of a plurality of extruded strands 105 is illustrated in FIG. 1. The apparatus 100 comprises a rigid frame structure 110 formed by interconnecting a plurality of rigid frame members 115. The rigid frame structure 110 has a to portion 120, a bottom portion 125, side portions 130, a front portion 135 and a rear portion 140 (FIG. 6). A rigid top plate member 145 is attached to an upper part of the front portion 135 and a rigid bottom plate member 150 is attached to a lower part of the front portion 135. A plurality of upper spindle units 155 is rotatably attached to the rigid top plate member 145 and a plurality of lower spindle units 160 is rotatably attached to the rigid bottom plate member 150. A pair of drive motors 165 is attached to the rigid frame structure 110. A gear assembly 170 attached to the rigid frame structure 110 is operably engaged to the pair of drive motors 165 and a chamber 175 (FIG. 6) is supported on the rigid, frame structure 110 for curing the plurality of extruded strands 105.

Figure 2:
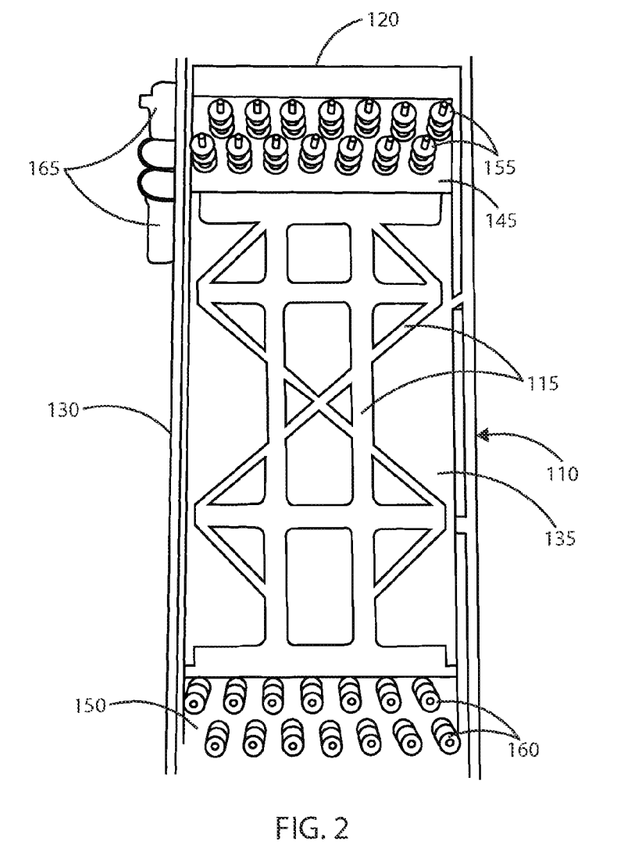
FIG. 2 illustrates a front view of the apparatus for continuous curing of the plurality of extruded strands in accordance with the present teachings.

FIG. 2 illustrates a front view of the apparatus 100 for continuous curing of a plurality of extruded strands 105 in accordance with the preferred embodiment of the present invention. The plurality of rigid frame members 115 is interconnected by any mechanical means of welding, riveting etc. to support the rigid frame structure 110. The bottom portion 125 of the rigid frame structure 110 fabricated to rest on ground surface for keeping the apparatus 100 in an upright position. The rigid top plate member 145 is attached to an upper part of the front portion 135. The rigid top plate member 145 is attached to the front portion 135 of the rigid frame structure 110 by mechanical means. Similarly the rigid bottom plate member 150 attached to a lower part of the front portion 135 fixed to the rigid frame structure 110 by mechanical means. The plurality of upper spindle units 155 is rotatably attached to the rigid top plate member 145. The plurality of upper spindle units 155 is aligned along two lines on the rigid top plate member 145. The plurality of upper spindle units 155 is positioned at specific distances along a top line and a bottom line on the rigid top plate member 145. The plurality of upper spindle units 155 arranged along the top line and the bottom line are substantially parallel to each other but each of the adjacent top and bottom plurality of upper spindle units 155 do not lay along the same vertical line. Similarly, the plurality of lower spindle units 160 is positioned at specific distances along an upper line and a lower line on the rigid bottom plate member 150. The plurality of lower spindle units 160 arranged along the upper line and the lower line are substantially parallel to each other but each of the adjacent upper and lower plurality of lower spindle units 160 do not lay along the same vertical line. Each of the plurality of lower spindle units 160 positioned on the rigid bottom plate member 150 aligns vertically with each of the plurality of upper spindle units 155 positioned on the rigid top plate member 145. This causes the plurality of extruded strands 105 to string up in a vertical fashion between the plurality of lower spindle units 160 and the plurality of upper spindle units 155, as shown in FIGS. 1 and 6.

Figure 3:
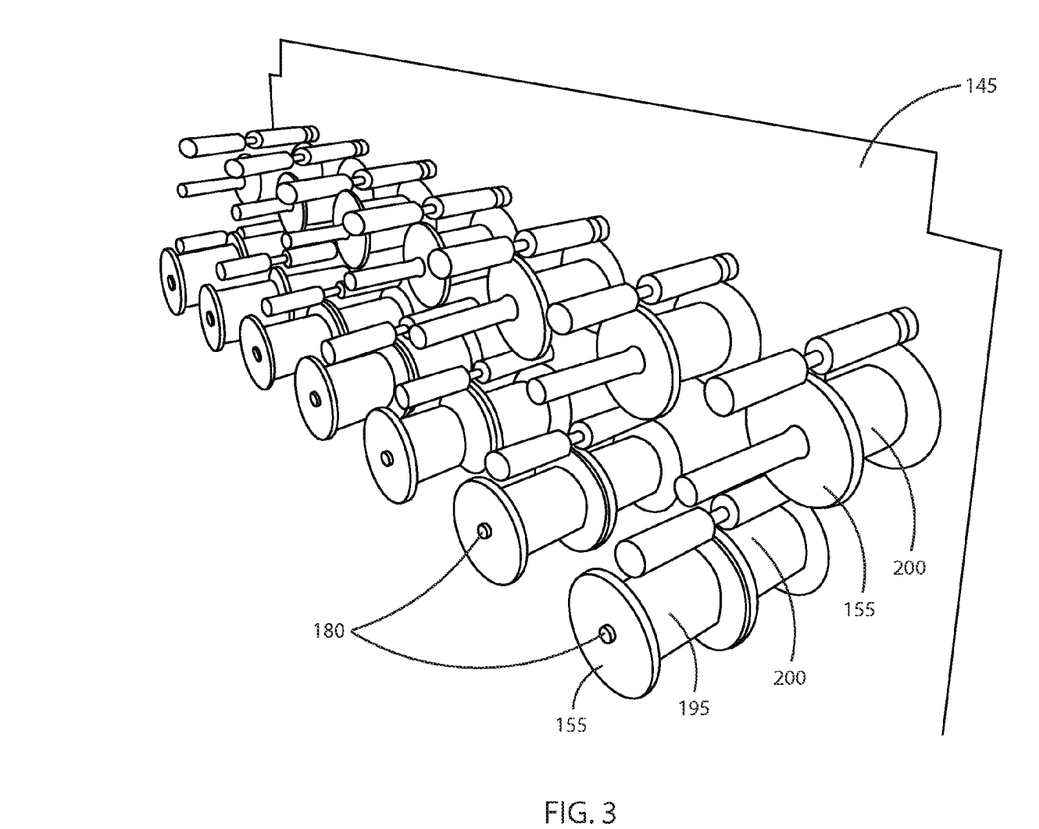
FIG. 3 illustrates a perspective view of a rigid top plate member showing a plurality of upper spindle units strands in accordance with the present teachings.

FIG. 3 illustrates a perspective view of the rigid top plate member 145 showing the plurality of upper spindle units 155. The rigid top plate member 145 may be made of sheet metal or any other rigid sheet of material. The rigid top plate member 145 attached to the rigid frame structure 110 is adapted to receive the plurality of upper spindle units 155 and the plurality of lower spindle units 160 are rotatably attached to the rigid top plate member 145 and the rigid bottom plate member 150 respectively. Each of the plurality of upper spindle units 155 and the plurality of lower spindle units 160 are provided with a dual spindle to wind, and unwind the plurality of extruded strands 105. FIG. 3 also shows the central shaft 180 around which the plurality of upper spindle units 155 are placed. The central shaft 180 is rotatably attached with the rigid top plate member 145 and the rigid bottom plate member 150. The dual spindle of each of the plurality of upper spindle units 155 and the plurality of lower spindle units 160 includes a free spinning roller 195 and a driven roller 200. The plurality of free spinning rollers 195 is freely rotatable about the central shaft 180 and the plurality of driven rollers 200 is keyed to the central shaft 180 and rotates along with the central shaft 180. The plurality of extruded strands 105 is wrapped around the plurality of dual spindle units 230 in a serial manner to manage a significant amount of length of the plurality of extruded strands 105 in a small, compact space.

Figure 4:
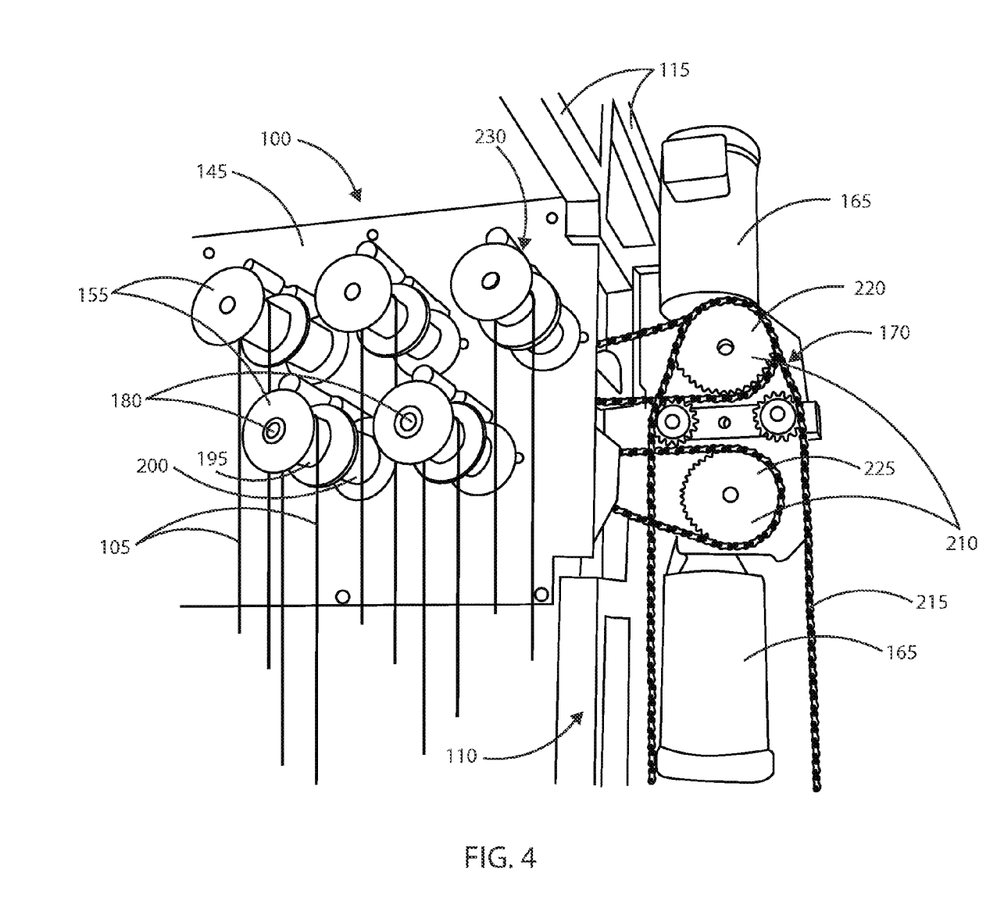
FIG. 4 illustrates a perspective view of the apparatus showing a pair of pair of drive motors, a top gear box and a bottom gear box in accordance with the present teachings.

FIG. 4 illustrates a perspective view of the apparatus 100 showing the pair of drive motors 165, the top gear box 220 and the bottom gear box 225. The pair of drive motors 165 is fixed to the rigid frame structure 110 and is rotatably engaged with the top gear box 220 and the bottom gear box 225. The pair of drive motors 165 drives the plurality of upper spindle units 155 arranged along two rows on the rigid top plate member 145. The top gear box 220 includes a sprocket 210 and a chain 215 connecting the sprocket 210 to rotate the plurality of upper spindle units 155 positioned along the top line on the rigid top plate member 145. Similarly the bottom gear box 225 includes a sprocket 210 and a chain 215 connecting the sprocket 210 to rotate the plurality of upper spindle units 155 positioned along the bottom line on the rigid top plate member 145. The continuous curing and post-curing apparatus 100 allows the extrudate to pass through the plurality of upper spindle units 155 and the plurality of lower spindle units 160 where the extrudate can be cured and/or post-cured continuously. The continuous curing and post-curing apparatus 100 allows multiple lines of the plurality of extruded strands 105*a*, 105*b* to pass through at various defined rates based on the characteristics of each extruded strand as decided by a controller (not shown) which controls the speed of the pair of drive motors 165, causing no disruption in the curing and/or post-curing process. Multiple lines of the plurality of extruded strands 105*a*, 105*b* can be passed at different rates by the combination of a driven roller 200 fixed to the central shaft 180 and the free spinning roller 195 on the same central shaft 180 while other driven rollers 200 are the opposite configuration allowing for multiple lines that can run at spate speeds while simultaneously passing through the same heating/cooling chamber 175. The plurality of upper spindle units 155 and the plurality of lower spindle units 160 are arranged so as to allow extrudate to string up in a vertical fashion where at the end of each vertical length the extrudate wraps around the driven roller 200 or free spinning roller 195 and runs parallel to the extrudate next to it and wraps around the next spindle and continues this arrangement in series. This allows for a significant amount of linear length to pass through in a small space and allows the extrudate to remain in the heating and/or the cooling zone for a desired time. While remaining a continuous process. It will be appreciated by a person skilled in the art that a plurality of spindle units may not only be connected in series, as described above, but also in parallel or in a combination of in-series and in-parallel.

It should be understood that the plurality of upper spindle units 155 and the plurality of lower spindle units 160 depicted in FIGS. 1-4 and 6 are exemplary only and those having ordinary skill in the art would appreciate that a variety of structures having differing configurations and numbers (e.g., other than 2) may be substituted for or used in conjunction with the plurality of upper spindle units 155 and the plurality of lower spindle units 160. The plurality of spindle units may include spindle units of the same or differing configurations.

The apparatus 100 and method is configured to allow for multiple or different curing and post-curing dwell times at temperature, based on the potential varied requirements of the extrudate material. This can be done by different sized rollers to allow for different size extrudates and by varying the speed of one or both of the pair of drive motors 165, which are controlled by the controller. The controller can include a central processing unit for receiving at least one electronic input signal and for generating at least one processed electronic output signal in accordance with a control program stored in memory. The controller can be programmed to control operating parameters such as the temperature, dwell time, drive motor speed, and the high velocity heat or forced air convection and cooling implemented by the plurality of heat-exchanger coils. By way of example, and not limitation, sensors such as temperature sensors, humidity sensors, and/or position sensors can provide a signal to the controller or central processing unit to enable accurate adjustment and control of the operating parameters.

Figure 5:
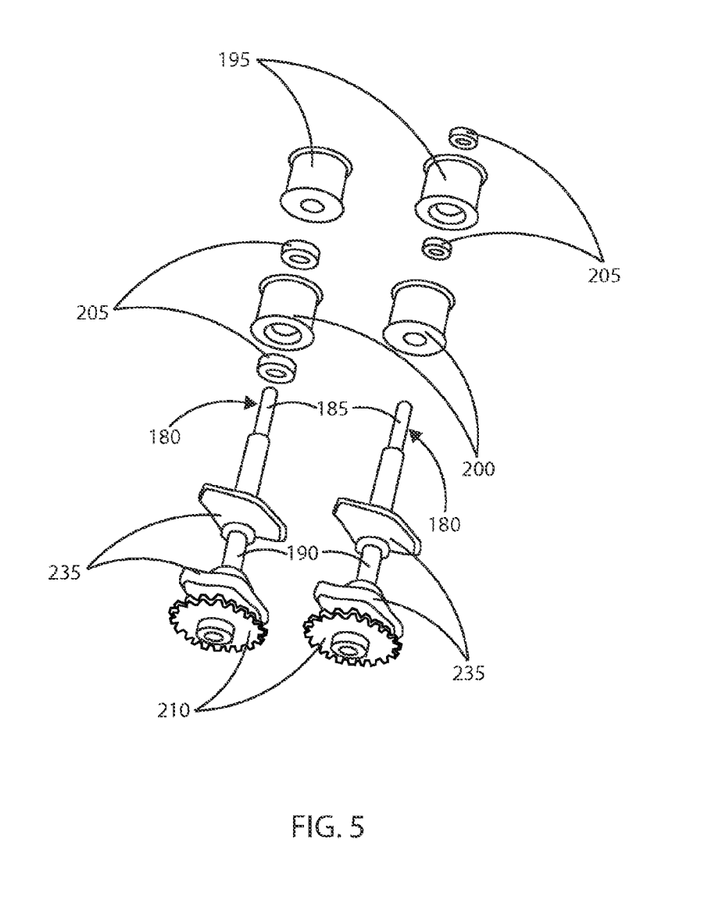
FIG. 5 illustrates an exploded view of a dual spindle and a central shaft assembly in accordance with the present teachings.

FIG. 5 illustrates an exploded view of an exemplary embodiment of a top dual spindle and central shaft assembly 182*a* and a bottom dual spindle and central shaft assembly 182*b*. Both the top 182*a* and the bottom 182*b* assemblies comprise a dual spindle that includes a free spinning roller 195 and a driven roller 200 positioned around the central shaft 180. The free spinning roller 195 is freely rotatable about the central shaft 180 and the plurality of driven rollers 200 is keyed to the central shaft 180 and rotates along with the central shaft 180. Each of the driven rollers 200 is keyed to the front end 185 of the central shaft by means of a collar 205. The rear end 190 of each of the central shaft 180 is attached with the sprocket 210. The plurality of sprockets 210 attached to the rear end 190 of each of the central shaft 180 of the plurality of upper spindle units 155 of the top assembly 182*a* positioned along the top line is connected to the top gear box 220 using the chain 215 and the plurality of upper spindle units 155 positioned along the bottom line is connected to the bottom gear box 225. The pair of drive motors 165 independently rotates the plurality of upper spindle units 155 arranged on a top line and the plurality of upper spindle units 155 of the bottom assembly 182*b* arranged on a bottom line. A pair of separators 235 for positioning each of the central shafts 180 is attached to the rear end 190.

FIG. 6 illustrates a perspective view of the apparatus 100 for continuous curing of a plurality of extruded strands 105 in accordance with the preferred embodiment of the present invention. The chamber 175 supported on the rigid frame structure 110 may act as a dual function chamber for heating/cooling the plurality of extruded strands 105. The chamber 175 includes a plurality of fined coils (not shown) to act as a plurality of heat-exchange coils. The pair of drive motors 165, which are controlled by the controller (not shown), drives multiple lines of the plurality of extruded strands 105 to pass through the free spinning roller 195 and the driven roller 200. Each of these plurality of extruded strands 105 run parallel in a vertical fashion between the plurality of upper spindle units 155 and the plurality of lower spindle units 160. The free spinning roller 195 and the driven roller 200 may rotate in an opposite configuration allowing multiple lines of the plurality of extruded strands 105 to run at spate speeds. This enables the plurality of extruded strands 105 to pass through the chamber 175. The chamber 175 allows continuous heating of the plurality of extruded strands 105 by forced air convection process and cooling by utilizing the plurality of heat-exchange coils. The apparatus 100 cures and post-cures the extrudate by a method of high velocity heat or forced-air convection concentrated around the extrudate and also cool the extrudate in the same fashion as heating via heat-exchanger coils in the passage way of the forced air convection where forced air is passed through the fined coils of the heat exchanger and closed looped refrigeration is passed through the fined coils to chill the forced air to a desired temperature.

Figure 7:
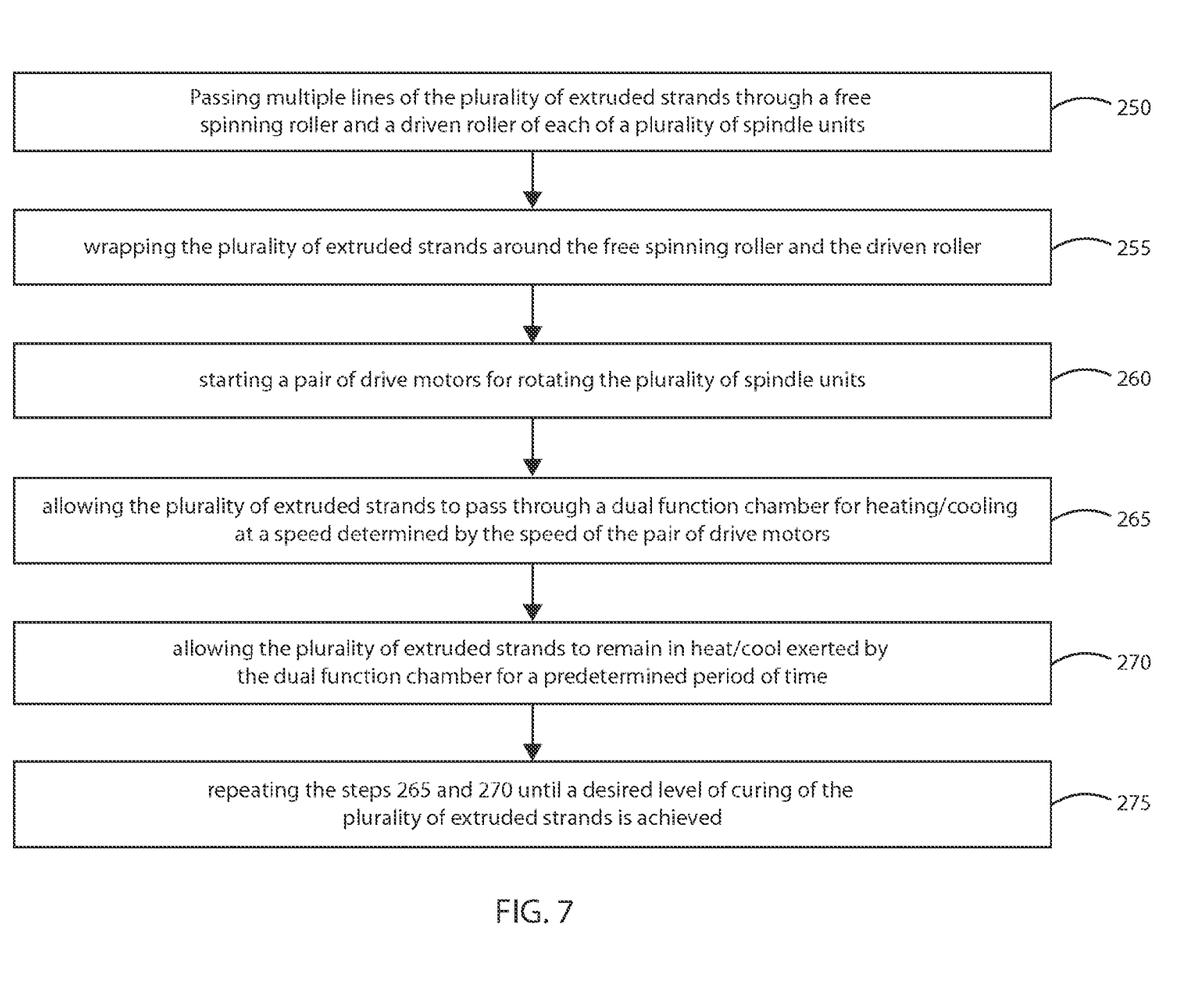
FIG. 7 illustrates the operational flow chart of a method for continuous curing and post-curing of the plurality of extruded strands utilizing the apparatus in accordance with the preferred embodiment of the present invention.

FIG. 7 illustrates the operational flow chart of a method for continuous curing and post-curing of the plurality of extruded strands utilizing the apparatus in accordance with the present teachings. Multiple lines of the plurality of extruded strands are passed through a free spinning roller and a driven roller of each of a plurality of spindle units as indicated at block 250. The plurality of extruded strands is wrapped around the free spinning roller and the driven roller as indicated at block 255. Thereafter, a pair of drive motors is started for rotating the plurality of spindle units as shown in block 260. The plurality of extruded strands is then allowed to pass through a dual function chamber for heating/cooling at a speed determined by a controller (not shown) which controls the speed of the pair of drive motors as indicated at block 265. Following this, as shown in block 270, the plurality of extruded strands is allowed to remain in heat/cool exerted by the dual function chamber for a predetermined period of time. For achieving the desired level of curing for the plurality of extruded strands, the steps 265 and 270 are repeated which would result in a continuous process of curing of the plurality of extruded strands as indicated at block 275.

The apparatus 100 and method cures and post-cures extrudate by the method of high velocity heat or forced-air convection concentrated around the extrudate and also can cool the extrudate in the same fashion as heating it via heat-exchange coils in the passage way of the forced air convection where the forced air is passed through the fined coils (not shown) of the heat exchanger and closed looped refrigeration is passed through the fined coils to chill the forced air to a desired temperature. This apparatus 100 and method also de-humidifies the extrudate by sensing the humidity within a forced air convection chamber and when there is too much humidity the controller (not shown) activates the low dew-point air, which is injected into the forced air convection chamber and vents out the most humid air based on the location of vent(s) in the system and lowers the humidity to a desired level which in turn lowers the humidity of the product.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method of continuous curing and post-curing of a plurality of extruded strands, the method comprising the steps of:
   wrapping multiple lines of a plurality of extruded strands through a plurality of spindle units rotatably connected to a rigid frame structure comprising:
      a plurality of interconnected rigid frame members, the rigid frame structure comprises a top portion, a bottom portion, a pair of side portions, a front portion and a rear portion;
      a rigid top plate member attached to an upper part of the front portion;
      a rigid bottom plate member attached to a lower part of the front portion;
      a plurality of upper spindle units rotatably attached to the rigid top plate member;
      a plurality of lower spindle units rotatably attached to the rigid bottom plate member;
      a plurality of dual spindles provided in the plurality of upper spindle units and the plurality of lower spindle units, wherein each dual spindle comprises a free spinning roller and a driven roller, and arranged in the plurality of upper spindle units and the plurality of lower spindle units such that a next dual spindle has a configuration opposite a prior dual spindle, wherein multiple lines of the plurality of extruded strands are wrapped around the free spinning roller and the driven roller of the plurality of dual spindles; the free spinning roller and the driven roller are adapted to rotate in an opposite configuration allowing the multiple lines of the plurality of extruded strands to run at a spate speed,
      a plurality of drive motors attached to the rigid frame structure;
      a gear assembly operably engaged to the plurality of drive motors, the gear assembly being attached to the rigid frame structure;
      a chamber supported on the rigid frame structure, the chamber comprises a dual function chamber configured for heating and cooling;
   operating the plurality of drive motors to drive the gear assembly to continuously transfer the plurality of extruded strands between the plurality of upper spindle units and the plurality of lower spindle units such that the plurality of extruded strands runs in a vertical fashion that continuously alternates between the plurality of lower spindle units and the plurality of upper spindle units;
   passing continuously the plurality of extruded strands through the dual function chamber for continuous curing and post-curing;
   operating independently each of the drive motors to independently control a transfer rate for each of the plurality of extruded strands; and
   controlling a speed of the plurality of drive motors by a controller to allow the plurality of extruded strands to remain in heat or cool selectively exerted by the dual function chamber for a predetermined period of time.

2. The method of claim 1, further comprising:
   transferring the plurality of extruded strands around an adjacent spindle unit in a serial manner to facilitate curing continuously a substantial amount of length of the plurality of extruded strands.

3. The method of claim 1, wherein passing continuously the plurality of extruded strands further comprises:
  continuous curing and post-curing of the plurality of extruded strands by a heating process step or by forced air convection as the plurality of extruded strands passes through the dual function chamber.

4. The method of claim 1, wherein passing continuously the plurality of extruded strands further comprises:
  continuous curing and post-curing of the plurality of extruded strands by a cooling process step or by a plurality of heat-exchange coils and closed loop refrigeration as the plurality of extruded strands passes through the dual function chamber.

5. The method of claim 1, further comprising:
  dehumidifying the plurality of extruded strands by passing low dew-point air into the dual function chamber as the plurality of extruded strands passes through the dual function chamber.

6. The method of claim 1, further comprising:
  passing a first line of the plurality of extruded strands at a first rate of speed and passing a second line of the plurality of extruded strands at a second rate of speed.

7. The method of claim 6, wherein the first rate of speed and the second rate of speed are selected independently of each other.

8. The method of claim 6, wherein the first rate of speed is based on characteristics of the first line of the extruded strands and the second rate of speed is based on characteristics of the second line.

9. The method of claim 1, wherein each of the drive motors is operated independently of the other to pass each plurality of extruded strand at a different rate of speed.

\* \* \* \* \*